United States Patent [19]

Baxter, Jr.

[11] Patent Number: 5,443,429
[45] Date of Patent: Aug. 22, 1995

[54] AUTOMATIC POWERSHIFTING TRANSFER CASE FOR A VEHICLE

[75] Inventor: Ralph W. Baxter, Jr., Fort Wayne, Ind.

[73] Assignee: Dana Corporation, Toledo, Ohio

[21] Appl. No.: 159,862

[22] Filed: Nov. 30, 1993

[51] Int. Cl.6 .............................................. F16H 48/02
[52] U.S. Cl. ..................................... 475/204; 475/206
[58] Field of Search ..................... 475/198, 204, 206; 180/249

[56] References Cited

U.S. PATENT DOCUMENTS

| | | | |
|---|---|---|---|
| 4,422,349 | 12/1983 | Matsumoto et al. | 74/665 GE |
| 4,458,557 | 7/1984 | Hayakawa | 74/665 GE |
| 4,804,061 | 2/1989 | Kameda | 180/247 |
| 4,854,413 | 8/1989 | Kameda et al. | 180/247 |
| 5,046,998 | 9/1991 | Frost | 475/221 |
| 5,057,062 | 10/1991 | Yamasaki et al. | 475/221 |
| 5,226,860 | 7/1993 | Baxter, Jr. et al. | 475/206 |
| 5,334,116 | 8/1994 | Baxter, Jr. | 475/204 |

*Primary Examiner*—Dirk Wright
*Attorney, Agent, or Firm*—Oldham, Oldham, & Wilson Co.

[57] ABSTRACT

The invention provides an automatic powershifting vehicle transfer case comprising a housing supporting a rotatably driven input shaft, a first output shaft rotatably coupled to one of the front or rear axles of a vehicle, and a second output shaft rotatably coupled to the other of the front or rear axles. A first planetary gear set has a first high speed range operating position, where torque from the input shaft is transferred to one or both of the front or rear axles of the vehicle with no speed reduction from planetary operation. The first planetary gear set includes a sun gear connected to rotate with the input shaft, a ring gear, and pinion gears supported in a carrier, with the planetary gear set being drivingly coupled to at least one of the output shafts. A first clutch associated with the first planetary gear set provides a predetermined output drive ratio to one or both of the output shafts. A second planetary differential gear set is associated with the first output shaft and has second clutch associated therewith to control torque transfer to the second output shaft in four-wheel drive modes of operation. The rotational speed of the first and second output shafts can be monitored, and the second clutch can be actuated to selectively lock the second planetary differential if there is a predetermined difference in rotational speeds between the first and second output shafts. Operation of the clutch is automatically effected such that torque received at the input shaft is selectively transferred to drive the first and second output shafts in a predetermined manner. Four-wheel drive modes are provided by a front output clutch assembly which selectively transfer torque to the front output shaft.

20 Claims, 4 Drawing Sheets

AUTOMATIC POWERSHIFTING TRANSFER CASE FOR A VEHICLE

BACKGROUND OF THE INVENTION

This invention generally relates to an automatic powershifting transfer case providing two-wheel drive, all-wheel drive (AWD) and four-wheel drive (4-WD) modes. More particularly, the transfer case is hydraulically shifted and electronically controlled to shift between high- and low-speed ranges, two-wheel drive, all-wheel drive or part-time four-wheel drive modes.

Four-wheel drive capabilities are becoming more popular in both light trucks as well as passenger vehicles. It is generally the case that such a vehicle will provide either two- or four-wheel drive modes of operation, with the mode of operation being selected manually by the vehicle operator. The torque transfer devices used in such vehicles do not provide simple operation or effective implementation of various drive modes automatically. Such transfer cases have used planetary gear sets to selectively apply torque to output shafts for two-wheel or four-wheel drive modes. In four-wheel drive operation, the output shafts are differentially driven, with torque divided between the output shafts permitting speed variation between the shafts. Alternatively, the output shafts can be selectively interlocked to drive the shafts without slippage therebetween. Transfer cases of this type have conventionally required shift means manually operated within the driver's compartment to shift between the two-wheel and four-wheel drive modes.

Similarly, prior art vehicle transfer cases have also provided high and low speed drive ranges, with shifting means for shifting between high and low speed drive ranges. Various problems have been encountered with affecting such shifting "on-the-fly" during vehicle operation. Further, shifting of the transfer case between high and low ranges is generally performed by the vehicle operator manually from within the driver's compartment. Again, the transfer cases have not provided automatic control of shifting between high and low speed ranges.

On the other hand, operator control over the drive mode of the vehicle is a desirable feature under many circumstances, with the ability to manually shift between high speed and low speed drive ranges, as well as to shift a center-differential gear assembly between two-wheel, four-wheel differential-free, and four-wheel differential-locked drive modes.

SUMMARY OF THE INVENTION

Based upon the foregoing, it is an object of the invention to provide an automatic powershift transfer case for a vehicle, which automatically controls operation of a center-differential shift means as well as operation of the transfer case to provide low speed and high speed drive ranges. The transfer case is also selectively operator controlled to be versatile and adaptable to many driving conditions.

These and other objects and features of the invention are accomplished by an automatic powershifting vehicle transfer case comprising a housing supporting a rotatably driven input shaft, a first output shaft rotatably coupled to one of the front or rear axles of a vehicle, and a second output shaft rotatably coupled to the other of the front or rear axles. A first planetary gear set has a first high speed range operating position, where torque from the input shaft is transferred to one or both of the front or rear axles of the vehicle with no speed reduction from planetary operation. The first planetary gear set includes a sun gear connected to rotate with the input shaft, a ring gear, and pinion gears supported in a carrier, with the planetary gear set being drivingly coupled to at least one of the output shafts. A first clutch means associated with the first planetary gear set provides a predetermined output drive ratio to one or both of the output shafts. A second planetary differential gear set is associated with the first output shaft and has second clutch means associated therewith to control torque transfer to the second output shaft in four-wheel drive modes of operation. Means may be provided to sense the rotational speed of the first and second output shafts, and the second clutch means can be actuated to selectively lock the second planetary differential if there is a predetermined difference in rotational speeds between the first and second output shafts. Operation of the clutch means is automatically effected such that torque received at the input shaft is selectively transferred to drive the first and second output shafts in a predetermined manner. Four-wheel drive modes are provided by a front output clutch assembly which selectively transfer torque to the front output shaft.

DETAILED DESCRIPTION OF THE INVENTION

Figure 1:
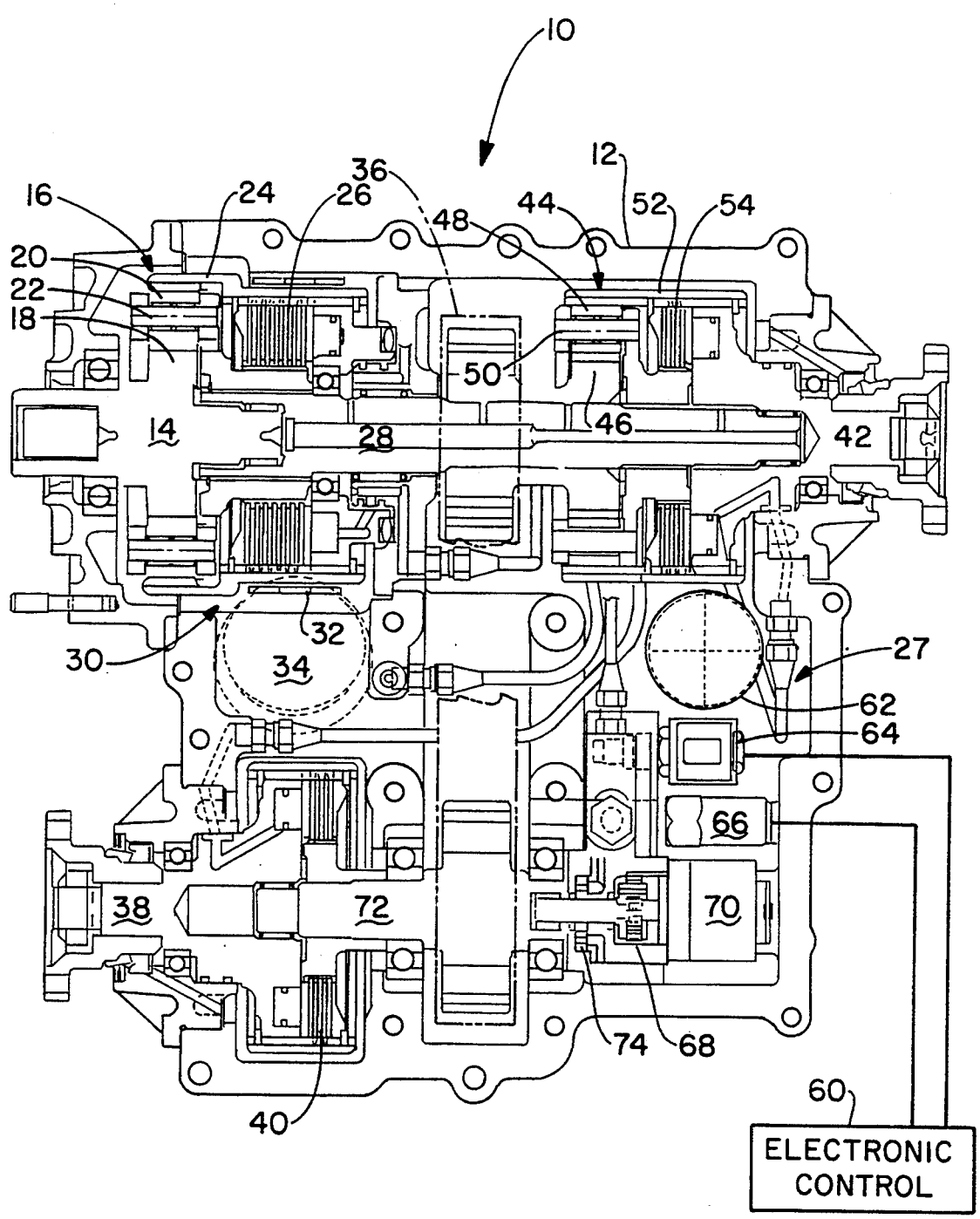
FIG. 1 shows a longitudinal, cross-sectional view of the automatic power shifting vehicle transfer case of the invention.

Turning now to FIG. 1, the automatic powershifting transfer case generally designated 10 is included in the drive train of a vehicle to selectively transfer torque to front and/or rear axle assemblies of a vehicle. The transfer case 10 includes a housing 12 carrying a transfer input shaft 14 which is coupled to a transmission output shaft for rotation therewith. A transfer gear assembly 16, comprising a planetary gear set, includes a sun gear 18 mounted for rotation with input shaft 14. Planetary pinion gears 20 are mounted within a carrier 22, and couple rotation of the sun gear 18 through to a ring gear 24 of the planetary gear set 16 in a predetermined gear ratio. A multi-disc clutch 26 is actuated by a hydraulic control system 27 to be hereinafter described, to lock to planetary carrier 22 to the ring gear 24 for direct connection and rotation therewith. Upon actuation of clutch 26, a one-to-one gear ratio is supplied through planetary gear set 16. Alternatively, with clutch 26 deactivated, the ring gear 24 rotates at a predetermined ratio relative to input shaft 14. The ring gear 24 is coupled to and rotatably drives an intermediate shaft 28. Associated with the transfer gear assembly 16 is a shift means 30, which includes a brake means 32 such as a band brake and actuating means 34 coupled to the hydraulic control system. The actuator 34 may be a piston which is movable into and out of engagement with the band 32. The shift means 30 is selectively actuated to apply pressure to band 32 and selectively ground ring gear 24. Grounding of ring gear 24 gives a reduction ratio in driving intermediate shaft 28. Actuation of the shift means 30 shifts the transfer case into a low speed drive range, while deactivation provides a high-speed drive range. The shift means 30 selectively transmits driving power to shaft 28 with or without torque multiplication. Operation of shift means 30 is controlled by the hydraulic system 27 and electronic control system of the transfer case 10, and allows smooth shifting "on-the-fly".

The shaft 28 carries and rotatably drives a sprocket and chain assembly 36 coupled to a front output shaft 38 through a multi-disc clutch 40. The clutch 40 is hydraulically actuated by the electronic control system 60. Upon actuation of clutch 40, chain drive assembly 36 will drive the front output shaft 38 for selective four-wheel drive operation. Shaft 28 is also coupled to a rear output shaft 42 through an AWD planetary differential 44. The planetary gear set 44 includes a sun gear 46 rotatably driven by shaft 28 and planetary pinion gears 48 in a carrier 50 coupled to a ring gear 52. The ring gear 52 rotatably drives the rear output shaft 42 with a ratio determined by the planetary gears 50.

The AWD planetary differential 44 provides differential-free and differential-locked drive modes when in four-wheel drive operation. A hydraulically controlled multi-disc clutch 54 is used to selectively lock the planetary differential 44 if a difference of speed between front and rear output shafts 38 and 42 is sensed by the automatic control system hereinafter described. The differential-locked operational mode prevents slippage between the output shafts and may be automatically provided when a predetermined amount of wheel slip occurs between the front and rear output shafts, exceeding differentiation to accommodate the maximum turn angle. Clutch 54 has enough capacity so that when in the differential-locked mode, it can be used in a part-time mode. Alternatively, when clutch 54 is deactivated, differential-free operation is provided. In four-wheel drive modes, the front and rear output shafts 38 and 42 may rotate at different speeds, while all-wheel drive is provided for constant speed driving conditions.

The transfer case 10 thus automatically provides two- and four-wheel drive modes, and differential free and differential-locked four-wheel drive operation. On the fly high and low speed driving ranges are also provided automatically. The transfer case 10 may also be manually shifted between drive modes and drive speed ranges for versatility in vehicle operation. User controlled switches (not shown) may be provided in the driver's compartment for overriding the electronic control system 60 which operates the hydraulic control system 27.

The automatic control of transfer case functions is performed by an electronic control system 60. The electronic control system 60 includes processing means, such as a microprocessor, which monitors vehicle operation via a variety of sensors (not shown) in a conventional manner. The control system 60 is described in more detail hereinafter. The control system 60 operates the hydraulic system 27 contained in the transfer case housing 12. The hydraulic control system 27 includes an accumulator 62 coupled to a reservoir containing hydraulic fluid, and electronically controlled solenoid valves 64 and 66 coupled between accumulator 62 and supply lines to the various clutches, piston actuator, etc., which are hydraulically controlled. Hydraulic pressure is generated by a hydraulic pump 68 driven by the transfer case itself or by means of an electric motor 70. The hydraulic pump 68 is connected to the intermediate shaft 72 which selectively drives the front output shaft 38 through chain assembly 36. Driving connection is made through a one-way clutch 74. The intermediate shaft will rotate via chain assembly 36 whether the vehicle is in two- or four-wheel drive modes, and while the vehicle is driven forward, this shaft will drive the hydraulic pump 68 through clutch 74. Alternatively, if the vehicle is driven in reverse or is stopped, the shaft 72 will rotate in the opposite direction or is not driven and therefore cannot drive pump 68. The electric motor 70 is thus used to drive pump 68 when the vehicle is sitting still or driven in reverse. The hydraulic pump 68 supplies pressure to accumulator 62 which in turn supplies hydraulic fluid under pressure to the electronically controlled valves 64 and 66. The hydraulic control system is conveniently provided within the transfer case housing 12, with the pressure supply integrated into the transfer case.

Figure 2:
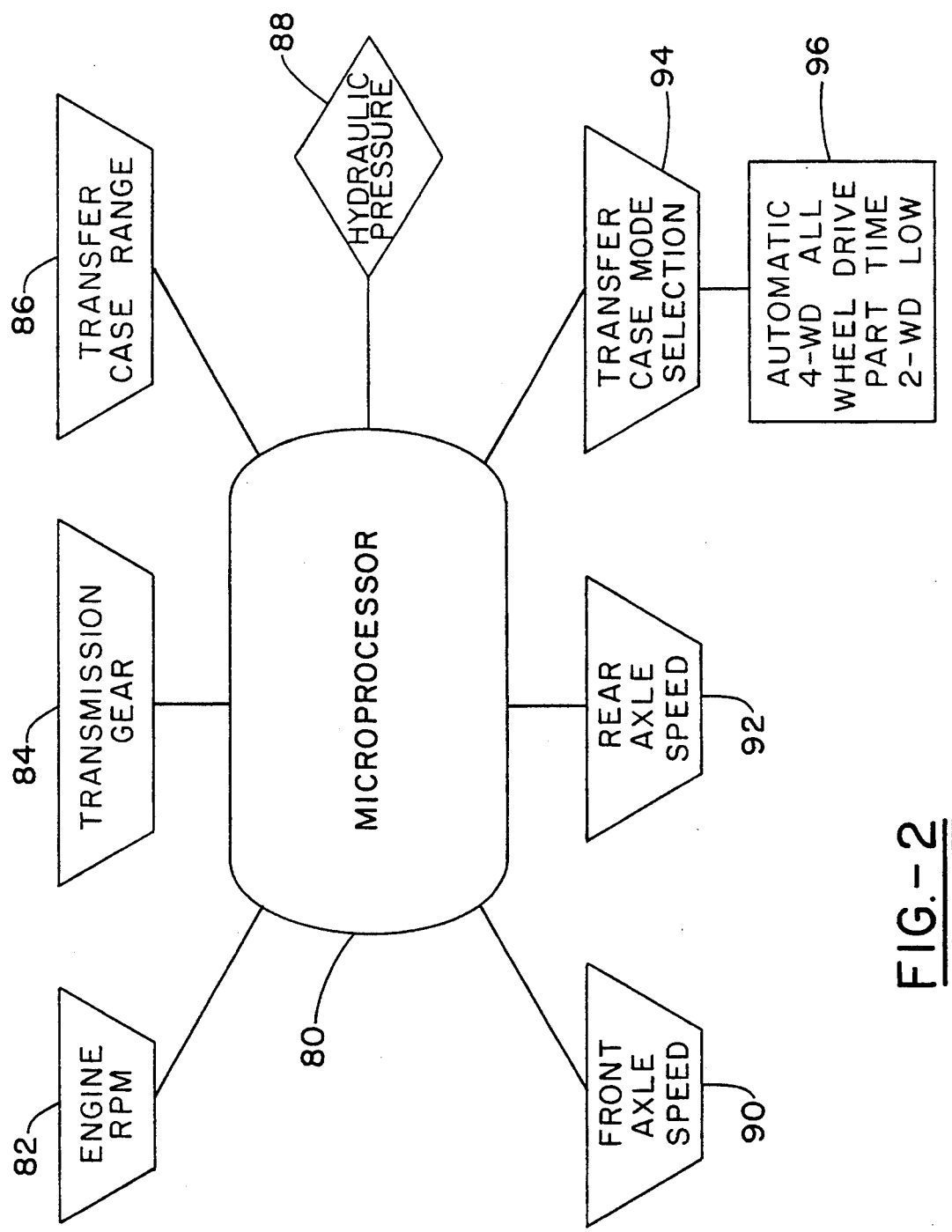
FIG. 2 shows a block diagram of the input parameters for operation of the fully automatic transfer case.

Automatic shifting of the transfer case is provided by electronic control system 60. A block diagram of the control system 60 is shown in FIG. 2, wherein a processing means 80, such as a microprocessor on board the vehicle is supplied with inputs from appropriate sensors used to monitor vehicle function. Inputs to microprocessor 80 include information on operational speed of the vehicle engine in terms of rotational speed of an output shaft from the vehicle transmission at 82. The transmission gear in which the vehicle is operating at any particular time is input at 84, and the transfer case range is input at 86. The microprocessor 80 will also receive as an input the hydraulic pressure maintained in the hydraulic actuating system at 88, to ensure suitable hydraulic pressure is being maintained, and to properly operate hydraulic control of the transfer case. Along with these inputs, both front and rear axle speeds are monitored at 90 and 92, supplying signals to microprocessor 80. Based upon the inputs, the microprocessor 80 will generate control signals for transfer case mode selection at 94, and will automatically select a desired operational mode at 96.

Figure 3:
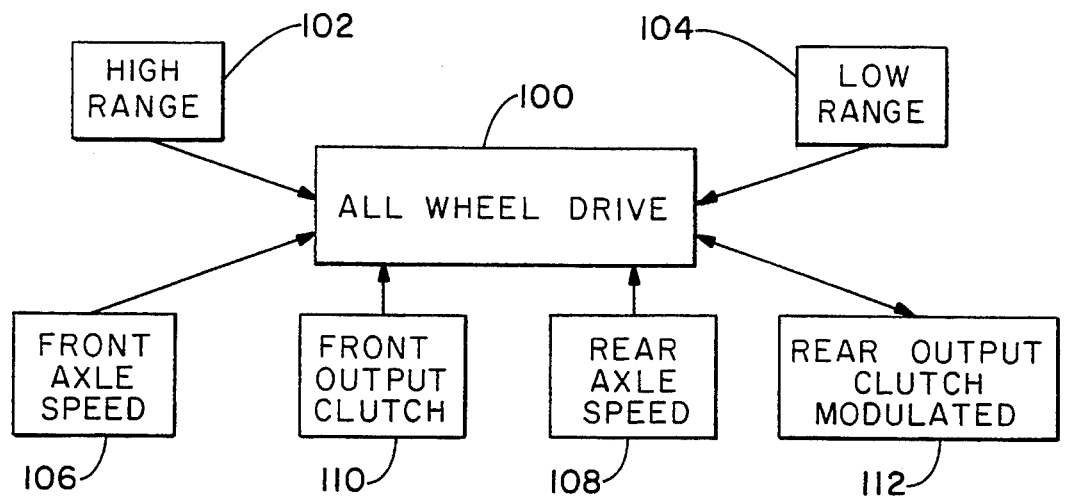
FIG. 3 is a block diagram of the all-wheel drive operation of the transfer case.

In FIG. 3, the all-wheel drive operational mode provided by the transfer case as shown at 100 may be operated in the high-speed range as indicated at 102, or the low-speed range as indicated at 104. The electronic control system will automatically select high- or low-speed ranges based upon inputs relating to front axle speed at 106, rear axle speed at 108, as well as information regarding whether the front output clutch is actuated at 110. In the all-wheel drive mode, the rear output clutch is used to selectively modulate torque division between the front and rear output shafts. In the all-wheel drive mode 100, the automatic control system will selectively modulate the rear output clutch to give proper torque division between front and rear output shafts, or to utilize the rear output clutch assembly to lock up the associated planetary gear set in the differential-locked mode at 112. Feedback as to the status of the rear output clutch is supplied to the control system for automatic control over these features.

Figure 4:
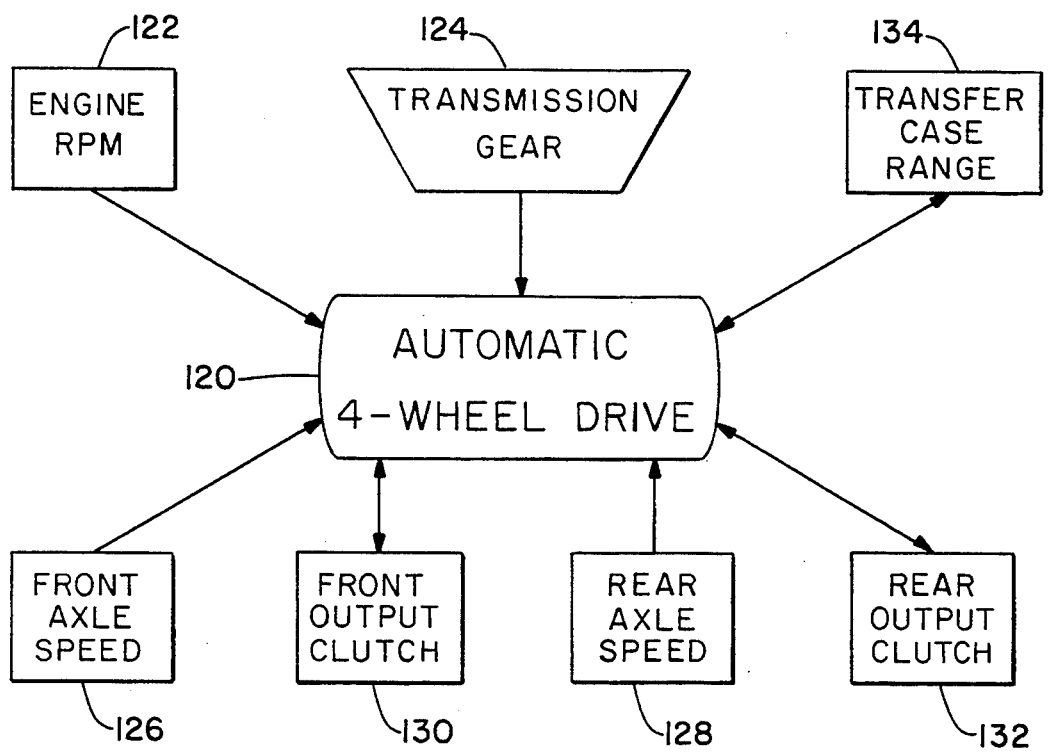
FIG. 4 is a block diagram of the automatic four-wheel drive operation of the transfer case.

Similarly, as shown in FIG. 4, the automatic four-wheel drive mode 120 controlled by the electronic control system has as inputs thereto the engine rpm at 122, the gear in which the transmission is operating at 124, front and rear axle speeds at 126 and 128, as well as feedback from transfer case functions including the status of the front and rear output clutches at 130 and 132 and the transfer case range at 134. The electronic control system will thereafter control function of the front and rear output clutches 130 and 132 as well as the transfer case range at 134 to provide desired vehicle operation automatically. The control system for the automatic four-wheel drive mode at 120 will then control operation of the front output clutch at 130, the rear output clutch at 132, and the transfer case range at 134 to effect four-wheel drive operation in the desired speed range. Shifting from high-speed range operation to the low-speed range can be automatically performed based upon certain operational parameters, such as when engine rpm is above a predetermined threshold and the gear ratio of the transmission may be changed without presenting safety risks. Similarly, actuation of the front output clutch to provide power to the front output shaft for four-wheel drive operation may be affected under predetermined conditions set in the control system. Automatic control over shifting of the transfer case into desired drive modes based upon certain operational characteristics of the vehicle is provided by the electronic control system, while allowing the vehicle operator to override the automatic control for versatile vehicle operation.

Figure 5:
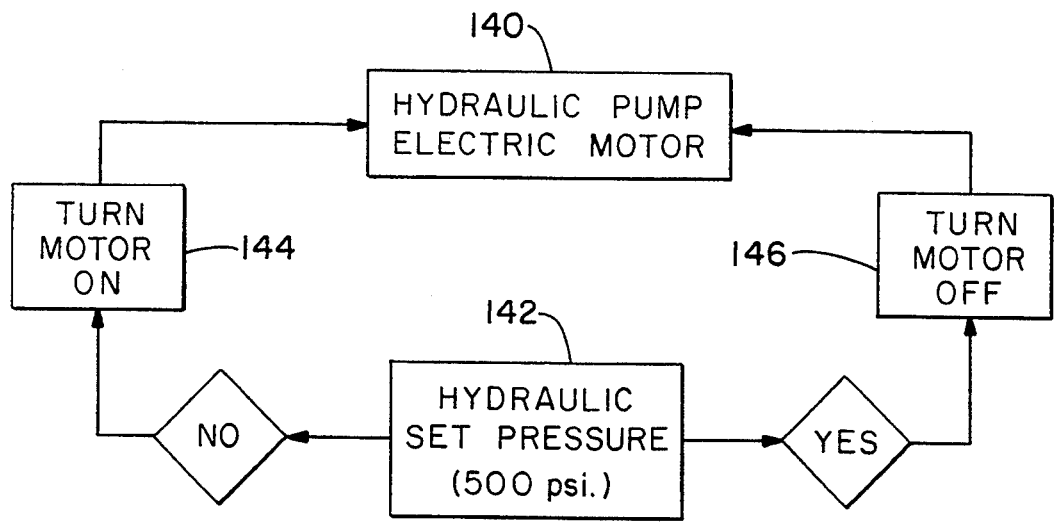
FIG. 5 shows a block diagram of the hydraulic pump and electric motor operation to actuate drive modes of the transfer case.

The electronic control system functions to control the hydraulic control system. As previously mentioned, the hydraulic system includes a hydraulic pump which is either driven by the transfer case itself or by means of an electric motor. As shown in FIG. 5, operation of the electric motor at 140 depends on whether pressure in the hydraulic system is above a predetermined threshold set by the electronic control system at 142. A predetermined pressure, such as 500 psi, is set for the hydraulic control system, and the electronic control system will monitor pressure in the hydraulic system and will selectively turn the electric motor on or off at 144 or 146 accordingly. In this manner, hydraulic pressure is maintained at desired operational levels at all times during vehicle operation.

Figure 6:
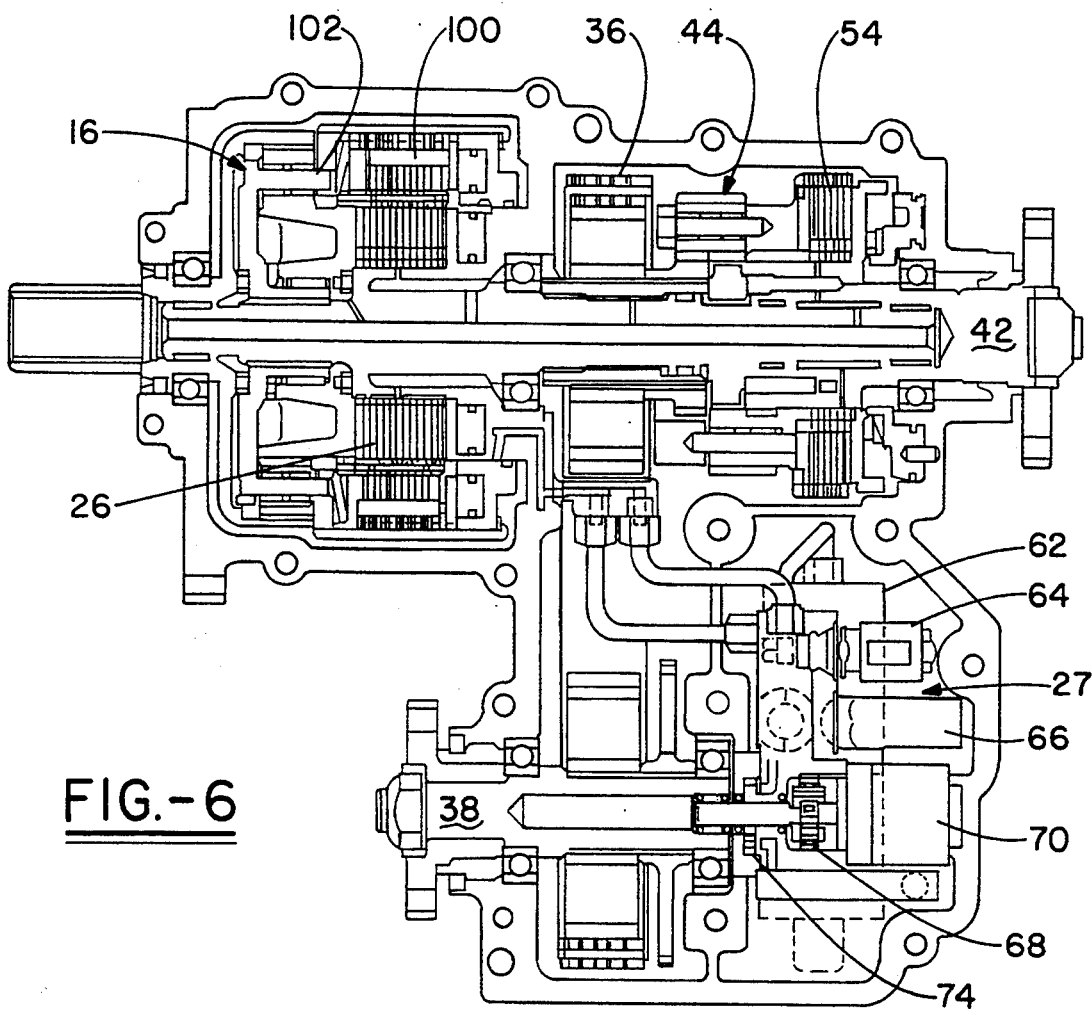
FIG. 6 shows a longitudinal, cross-sectional view of an alternate embodiment of the invention.

Turning now to FIG. 6, an alternate embodiment of the transfer case is shown, with common reference numerals used to describe common features of this embodiment. Particularly in this embodiment, the control over on-the-fly shifting between high-speed and low-speed drive ranges is performed by clutch means 100 instead of the band brake described in the previous embodiment. In this embodiment the clutch means 100 is a multi-disk clutch, hydraulically actuated to clamp down on the ring gear of the differential gear set 16. In this embodiment, a Belleville washer 102 is used to normally apply pressure to the clutch plates to maintain drive to one or both of the rear and front output shafts of the transfer case even if hydraulic pressure is lost in the hydraulic control system. Actuation of the clutch means 100 will again ground the ring gear of the planetary system giving a reduction ratio or low-speed range as desired.

The objects and advantages of the invention have been described relative to preferred embodiments thereof, but it will be appreciated that various modifications can be made without departing from the spirit or scope of the invention as defined in the appended claims.

What is claimed is:

1. An automatic powershifting vehicle transfer case, comprising,
    a housing supporting a rotatably driven input shaft, a first output shaft rotatably coupled to one of the front or rear axles of a vehicle and a second output shaft rotatably coupled to the other of said front or rear axles of said vehicle,
    a first planetary gear set associated with said input shaft, including a sun gear connected to said input shaft to rotate therewith, a ring gear and a pinion gear set supported in a carrier, said planetary gear set being drivingly coupled to one of said output shafts,
    a first clutch associated with said first planetary gear set, which in relation therewith will provide a predetermined output drive ratio to at least one of said first or second output shafts,
    a second planetary differential gear set associated with said first output shaft, and having second clutch associated with said second planetary differential gear set to selectively control torque transfer to the second output shaft, and
    a third clutch associated with said second output shaft, being selectively actuated to drivingly couple means to drive said second output shaft to said second output shaft, such that torque is selectively transferred to drive said second output shaft, and
    a control system for automatically actuating said first, second or third clutch means to provide two-wheel, four-wheel and all-wheel drive modes of operation.

2. The transfer case of claim 1, wherein,
    said first clutch is actuated to lock said carrier of said first planetary gear set to said ring gear, with said ring gear drivingly coupled to said first output shaft for driving said first output shaft in a one-to-one ratio with said input shaft.

3. The transfer case of claim 1, further comprising,
    means to selectively ground said ring gear of said first planetary gear set, said means being selectively actuated by said control system; wherein grounding of said ring gear of said first planetary gear set gives a reduction ratio in driving one of said output shafts during operation of said vehicle.

4. The transfer case of claim 3, wherein,
    said means to ground said ring gear comprises a brake selectively actuated by a piston to engage said ring gear.

5. The transfer case of claim 3, wherein,
    said means to ground said ring gear is a fourth clutch selectively actuated to engage said ring gear.

6. The transfer case of claim 1, wherein,
    said first clinch is actuated to drive said first output shaft, and said third clutch is actuated to drive said second output shaft for automatically providing a four-wheel drive mode of operation.

7. The transfer case of claim 1, wherein,
    said control system includes means to sense the rotational speed of said first and second output shafts, and automatically actuates said second clutch to selectively lock said second planetary differential if a predetermined difference in rotational speeds between said first and second output shafts is sensed, to prevent relative slippage between said first and second output shafts in a differential-locked mode of operation.

8. The transfer case of claim 6, further comprising, means to selectively ground said ring gear of said first planetary gear set actuated by said control system, wherein grounding of said ring gear will give a reduction ratio in transfer of torque to said first and second output shafts.

9. The transfer case of claim 1, wherein, said control system is an electronic control system and a hydraulic shifting system, wherein said electronic control system receives input signals corresponding to present vehicle operation, and automatically selects the transfer case mode of operation based upon said input signals, wherein said electronic control system operates said hydraulic shifting system to selectively actuate said first, second or third clutch means to provide a selected mode of operation.

10. The transfer case of claim 9, wherein, said input signals include engine RPM, transmission gear, front axle speed, rear axle speed and hydraulic pressure signals which are supplied to a microprocessor, wherein said microprocessor is programmed to control actuation of said third clutch means to automatically select two- or four-wheel drive modes of operation, with said second clutch means selectively actuated to provide differential-free or differential-locked modes of four-wheel drive operation.

11. The transfer case of claim 9, further comprising, means to ground said ring gear of said first planetary gear set being selectively actuated by said control means, wherein grounding of said ring gear will give a reduction ratio in the torque transfer to said output shafts, with said input signals including the transfer case range for automatically selecting a low speed drive range in vehicle operation.

12. The transfer case of claim 9, wherein, said hydraulic shifting system includes an accumulator coupled to a hydraulic fluid reservoir, and electronically controlled solenoid valves coupled between said accumulator and supply lines to said first, second and third clutches for actuation thereof, with hydraulic pressure in the system being generated by a hydraulic pump contained within said housing.

13. The transfer case of claim 12, wherein, said hydraulic pump is coupled to said means to drive said second output shaft through a one-way clutch such that driving of said means to drive said second output shaft in a first rotational direction will affect driving of the pump to generate hydraulic pressure which is supplied to said accumulator.

14. The transfer case of claim 13, further comprising, an electric motor associated with said hydraulic pump, said motor operating to generate hydraulic pressure when said hydraulic pump is not connected to said means to drive said second output shaft through said one-way clutch.

15. The transfer case of claim 1, further comprising, operation mode selecting means operated in a driver's compartment of said vehicle to select a drive mode of operation, said operation mode selecting means overriding said control system to select a drive mode of operation if such selected operation is a safe vehicle function which can be performed based upon the present mode of operation of said vehicle.

16. An automatic powershifting vehicle transfer case, compromising, a housing supporting a rotatably driven input shaft, a first output shaft coupled to said input shaft to drive one of the front or rear axles of a vehicle and a second output shaft coupled to drive to the other of said front or rear axles of said vehicle, a planetary differential gear set associated with said first output shaft, and having a first clutch associated with said planetary differential gear set to selectively control torque transfer to said second output shaft, a second clutch associated with said second output shaft, being selectively actuated to drivingly couple means to drive said second output shaft to said second output shaft to selectively transfer torque to drive said second output shaft, and a control system for automatically actuating said first and second clutches to provide two-wheel, four-wheel and all-wheel drive modes of operation.

17. The transfer case of claim 16, wherein, said control system includes sensors to sense the rotational speed of said first and second output shafts, and automatically actuates said first clutch to selectively lock said planetary differential gear set upon the occurrence of a pre-determined difference in rotational speeds between said first and second output shafts, to prevent relative slippage between said first and second output shafts in a differential-locked mode of operation.

18. The transfer case of claim 16, wherein, said control; system is an electronic control system which receives input signals corresponding to present vehicle operation, and automatically selects the transfer case mode of operation based upon said input signals, wherein said electronic control system operates to actuate said first and second clutches to provide a selected mode of operation.

19. The transfer case of claim 18, wherein, said input signals include engine RPM, transmission gear, front axle speed, and rear axle speed, which are supplied to a microprocessor, said microprocessor being programmed to control actuation of said first and second clutches, wherein actuation of said second clutch selects two or four wheel drive modes of operation, and actuation of said first clutch provides differential-free or differential-locked modes of four-wheel drive operation.

20. The transfer case of claim 16, further comprising, a planetary gear set associated with said input shaft including a sun gear connected to said input shaft to rotate therewith, a ring gear and a pinion gear set supported in a carrier, said planetary gear set being drivingly coupled to said first output shaft and a third clutch associated with said planetary gear set which is actuated to provide a predetermined drive ratio to said first output shaft from said input shaft.

* * * * *